United States Patent
Mohamed et al.

(10) Patent No.: US 9,194,947 B1
(45) Date of Patent: Nov. 24, 2015

(54) RADAR SYSTEM USING MATCHED FILTER BANK

(71) Applicant: Raytheon Company, Waltham, MA (US)

(72) Inventors: Jama A. Mohamed, Acton, MA (US); Dennis E. Nieskoski, Danvers, MA (US); William Kennedy, Boston, MA (US); Jack J. Schuss, Newton, MA (US)

(73) Assignee: RAYTHEON COMPANY, Waltham, MA (US)

( * ) Notice: Subject to any disclaimer, the term of this patent is extended or adjusted under 35 U.S.C. 154(b) by 125 days.

(21) Appl. No.: 13/665,107

(22) Filed: Oct. 31, 2012

(51) Int. Cl.
| | |
|---|---|
| *G01S 13/58* | (2006.01) |
| *G01S 13/64* | (2006.01) |
| *G01S 7/292* | (2006.01) |
| *G01S 7/40* | (2006.01) |
| *G01S 13/00* | (2006.01) |
| *G01S 7/00* | (2006.01) |

(52) U.S. Cl.
CPC ............ *G01S 13/582* (2013.01); *G01S 7/4021* (2013.01)

(58) Field of Classification Search
CPC ............ G01S 7/02; G01S 7/28; G01S 7/285; G01S 7/288; G01S 7/292; G01S 7/35; G01S 7/352; G01S 7/354; G01S 7/40; G01S 7/4004; G01S 7/4021; G01S 13/003; G01S 13/02; G01S 13/04; G01S 13/06; G01S 13/10; G01S 13/103; G01S 13/106; G01S 13/24; G01S 13/26; G01S 13/32; G01S 13/34; G01S 13/342; G01S 13/343; G01S 13/345; G01S 13/42; G01S 13/58; G01S 13/581; G01S 13/582; G01S 13/583; G01S 13/584; G01S 13/588; H04B 1/69; H04B 1/707; H04B 1/709; H04B 1/7093; H04L 27/26; H04L 27/2601; H04L 27/2647; H04L 27/2655; H04L 27/2662; H04L 27/2665
USPC .................. 342/21, 27, 28, 59, 89–115, 118, 342/128–147, 165, 173–175, 192–197, 342/25 R–25 F, 159, 189; 367/87, 95, 97, 367/98; 375/130, 140, 147–153, 141, 143, 375/316, 340, 343
See application file for complete search history.

(56) References Cited

U.S. PATENT DOCUMENTS

| | | | | |
|---|---|---|---|---|
| 3,609,672 | A | * | 9/1971 | Bossert ........................... 367/97 |
| 3,798,644 | A | * | 3/1974 | Constant ....................... 342/107 |
| 4,117,481 | A | * | 9/1978 | Constant ....................... 342/192 |
| 4,353,067 | A | * | 10/1982 | Mims ............................ 342/189 |

(Continued)

OTHER PUBLICATIONS

Definition entry for the word "computer" in the on-line Merriam-Webster Dictionary, year of copyright is 2014.*

(Continued)

*Primary Examiner* — Bernarr Gregory
(74) *Attorney, Agent, or Firm* — Daly, Crowley, Mofford & Durkee, LLP

(57) ABSTRACT

A radar receiver includes a bank of matched filters for use in processing return signals received from a remote target. In some embodiments, the radar receiver is capable of generating accurate estimates of target range and range rate based on returns from a single transmitted pulse having a low time-bandwidth product. In at least one embodiment, a computationally efficient interpolation technique is used to generate an estimate of an actual target Doppler frequency based on output signals of the bank of matched filters.

28 Claims, 13 Drawing Sheets

(56) References Cited

U.S. PATENT DOCUMENTS

| | | | | |
|---|---|---|---|---|
| 4,355,311 | A | * | 10/1982 | Frosch et al. ............... 342/196 |
| 4,403,314 | A | * | 9/1983 | Tournois ..................... 342/196 |
| 4,746,924 | A | * | 5/1988 | Lightfoot .................... 342/159 |
| 4,875,050 | A | * | 10/1989 | Rathi ......................... 342/195 |
| 4,901,082 | A | * | 2/1990 | Schreiber et al. ......... G01S 7/28 342/89 |
| H767 | H | * | 4/1990 | Kretschmer et al. ......... 342/145 |
| 4,937,583 | A | * | 6/1990 | Poinsard ..................... 342/195 |
| 5,047,784 | A | * | 9/1991 | Gerlach et al. ............... 342/145 |
| 5,113,194 | A | * | 5/1992 | Krikorian et al. ............ 342/106 |
| 5,151,702 | A | * | 9/1992 | Urkowitz ..................... 342/134 |
| 5,173,706 | A | * | 12/1992 | Urkowitz ..................... 342/99 |
| 5,337,053 | A | * | 8/1994 | Dwyer ........................ 342/90 |
| 5,381,154 | A | * | 1/1995 | Guerci ......................... 342/90 |
| 5,440,311 | A | * | 8/1995 | Gallagher et al. ............ 342/132 |
| 5,565,872 | A | * | 10/1996 | Prevatt et al. ................ 342/193 |
| 5,657,022 | A | * | 8/1997 | Van Etten et al. ........... 342/104 |
| 5,784,026 | A | * | 7/1998 | Smith et al. ................. 342/196 |
| 6,154,443 | A | * | 11/2000 | Huang ................... H04B 1/7093 375/130 |
| 6,297,764 | B1 | * | 10/2001 | Wormington ......... G01S 7/4021 342/101 |
| 7,224,721 | B2 | * | 5/2007 | Betz et al. .................... 375/152 |
| 7,301,495 | B2 | * | 11/2007 | Abatzoglou et al. ......... 342/192 |
| 7,382,310 | B1 | * | 6/2008 | Piesinger ..................... 342/28 |
| 7,447,259 | B2 | * | 11/2008 | Betz et al. .................... 375/152 |
| 8,149,961 | B1 | * | 4/2012 | Tewfik ................. H04L 27/2665 375/343 |
| 8,305,256 | B1 | * | 11/2012 | Manickam et al. ........... 342/111 |

OTHER PUBLICATIONS

Rihaczek; "Range Accuracy of Chirp Signals;" Proceedings of the IEEE; vol. 53, Issue 4; Apr. 1965; pp. 412-413.

Skoknik; "Theoretical Accuracy of Radar Measurements;" IRE Transactions on Aeronautical and Navigational Electronics; vol. ANE-7, Issue 4; Dec. 1980; pp. 123-129.

* cited by examiner

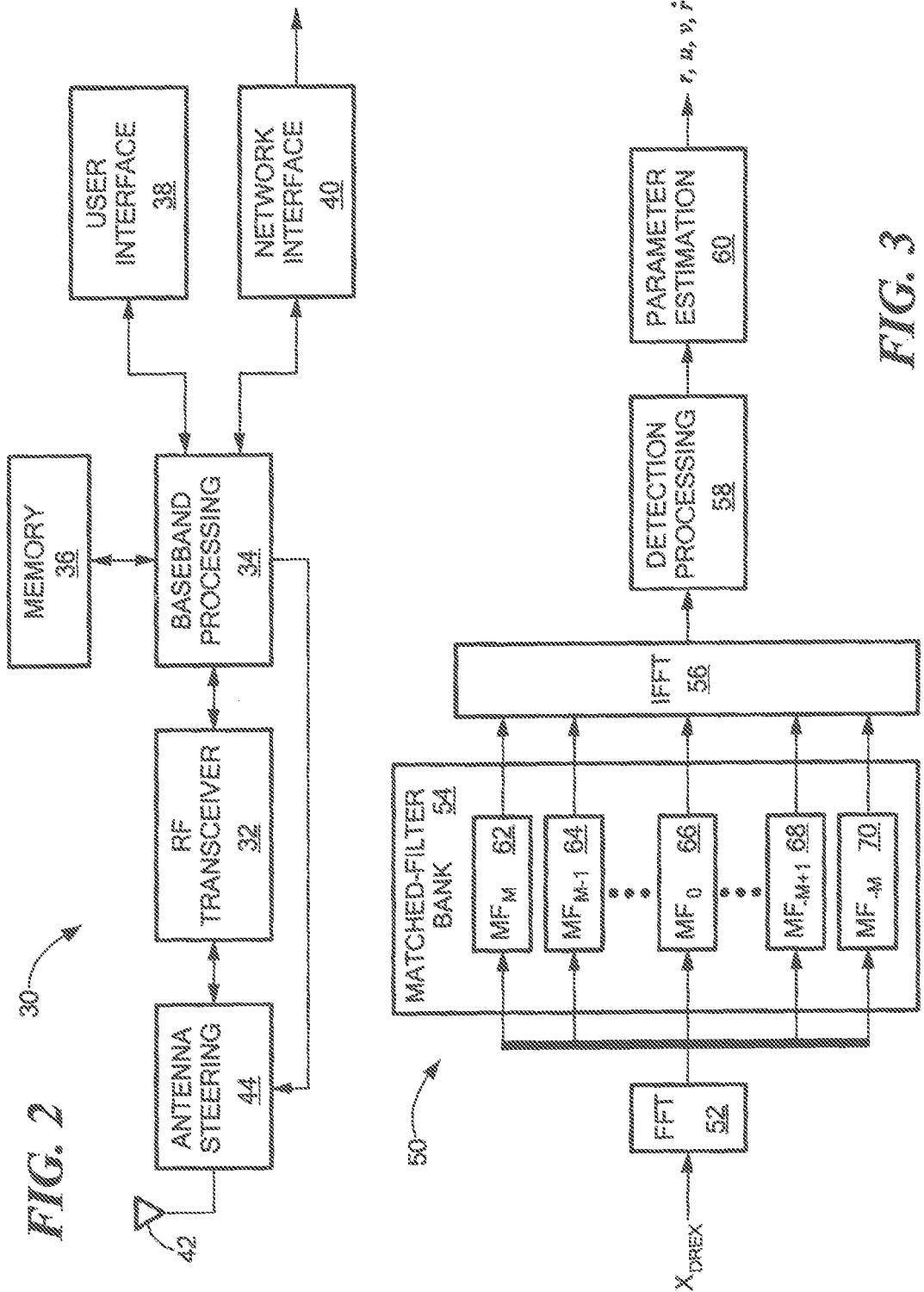

RADAR SYSTEM USING MATCHED FILTER BANK

GOVERNMENT RIGHTS

This work was supported by the United States Air Force under Contract No. FA8707-11-C-0004. The Government has certain rights in this invention.

BACKGROUND

A radar system is a system that derives information about one or more remote targets (e.g., objects, weather formations, terrain, etc.) by transmitting radio frequency (RF) signals toward the targets and analyzing RF energy that is reflected back from the targets. In many modern radar applications, systems may be called upon to detect and/or track a large number of objects or targets. Because the number of potential targets can be large, these radar systems may have limited resources available (e.g. time, processing resources, etc.) to process each individual target. There is therefore a need for systems, devices, and techniques that are capable of accurately determining information about one or more remote targets in a radar system using fewer resources than previously required.

SUMMARY

Systems, devices, and techniques disclosed herein are capable of deriving accurate information about a remote target using a single pulse of radio frequency (RF) energy. In some implementations, the single pulse of RF energy may be a linearly frequency modulated pulse (i.e., a chirp signal), although other types of pulses may also be used. In addition, in some implementations, a low bandwidth chirp signal may be used that has a low time bandwidth product. A bank of matched filters may be used to process target returns resulting from the transmitted pulse. Each of the matched filters within the filter bank may be tuned to a different Doppler frequency. Interpolation may be used to determine an accurate estimate of the actual Doppler frequency of a target. Target range rate may then be determined based on the Doppler estimate. In some implementations, a radar cross section (RCS) of the target may be derived based on an amplitude mismatch power loss relationship.

In accordance with one aspect of the concepts, systems, circuits, and techniques described herein, a machine implemented method to estimate information about a remote target using reflected energy, comprises: receiving a return signal at a receiver, the return signal resulting from a single transmitted pulse reflecting off the remote target; applying the return signal to a bank of matched filters, wherein different matched filters in the bank of matched filters are tuned to different Doppler frequencies; selecting a matched filter having a highest output signal magnitude from the bank of matched filters, the selected matched filter being tuned at a first Doppler frequency; using interpolation to determine an estimate of an actual Doppler frequency of the remote target based, at least in part, on the first Doppler frequency associated with the selected matched filter; and calculating an estimated range rate of the target based, at least in part, on the estimate of the actual Doppler frequency of the target.

In accordance with another aspect of the concepts, systems, circuits, and techniques described herein, a receiver system comprises: a bank of matched filters to process a received radar return signal reflected from a remote moving target, wherein each matched filter in the bank of matched filters is tuned at as different Doppler frequency; and one or more digital processors to: detect pulses in output signals of the bank of matched filters; and estimate parameters of the remote moving target based on output signals of the bank of matched filters resulting from transmission of a single radar pulse, the parameter estimation unit to estimate at least an actual range rate of the remote moving target and an actual amplitude of the received radar return signal.

In accordance with still another aspect of the concepts, systems, circuits, and techniques described herein, a method for calibrating a radar receiver having a bank of matched filters that are each tuned at a different Doppler frequency comprises: computing frequency responses of matched filters in the bank of matched filters; curve fitting the frequency responses to a first polynomial having first coefficients; re-generating the frequency responses using the first coefficients; selecting at least two frequency response curves from the re-generated frequency responses; calculating discrimination slope data using points on the at least two selected frequency response curves; curve fitting the discrimination slope data to a second polynomial having second coefficients; and storing the second coefficients in a memory for later use in interpolation operations.

BRIEF DESCRIPTION OF THE DRAWINGS

The foregoing features may be more fully understood from the following description of the drawings in which:

FIG. 2 is a block diagram illustrating a transceiver station that may incorporate features described herein in accordance with an embodiment;

FIG. 3 is a block diagram illustrating an exemplary processing arrangement for processing a return signal in a radar system in accordance with an embodiment;

DETAILED DESCRIPTION

Figure 1:
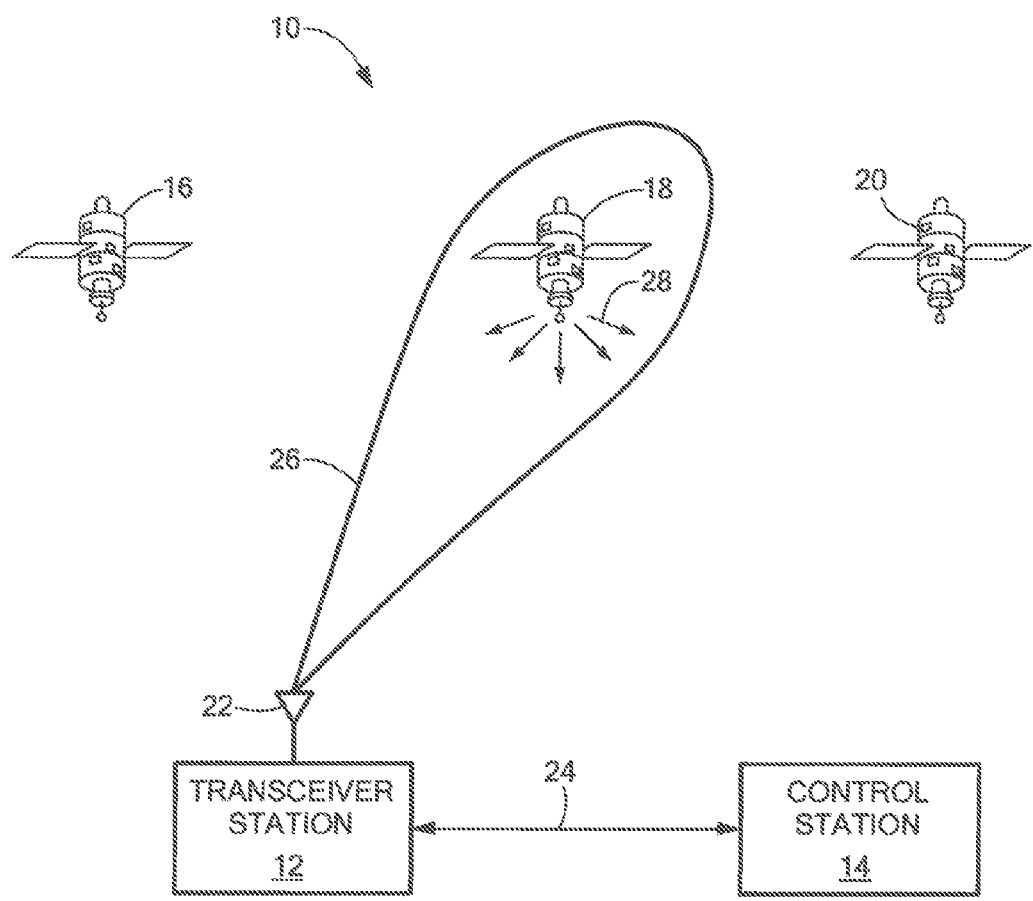
FIG. 1 is a diagram illustrating a surveillance space tracker radar system that may incorporate one or more of the features, techniques, and/or structures described herein.

FIG. 1 is a diagram illustrating a surveillance space tracker radar system 10 that may incorporate one or more of the features, techniques, and/or structures described herein. The radar system 10 may be operative for monitoring a portion of space to detect and subsequently track targets propagating within that space. The targets may include, for example, active satellites, disabled satellites, spacecraft, space debris, and/or other objects. Space debris may include, for example, abandoned rocket parts, objects that escape from satellites or space vehicles, debris caused by vehicle collisions, debris caused by deliberate vehicle destruction, and/or other objects that are orbiting the Earth. The surveillance space tracker radar system 10 may limit its surveillance to a particular sector of space (e.g., a portion above a particular country or continent, etc.) and may also limit its surveillance to a particular range with respect to the Earth (e.g., low Earth orbit (LEO), medium Earth orbit (MEO), a combination of LEO and MEO, etc.). Information about tracked targets may be used, for example, to prevent future collisions in space and/or for other purposes.

As shown in FIG. 1, in at least one embodiment, radar system 10 may include a transceiver station 12 and a control station 14. The transceiver station 12 may be operative for detecting the presence of targets 16, 18, 20 and for tracking detected targets. Although illustrated with a single transceiver station 12, it should be appreciated that, in some implementations, system 10 may include a number of transceiver stations 12 in geographically diverse locations to track targets in space. Control station 14 may be operative for controlling the operation of transceiver station(s) 12 and for collecting, coordinating, and storing information generated by transceiver station(s) 12. Control station 14 may also be operative for analyzing tracked target information as part of an effort to, for example, prevent future collisions in space. A network 24 and/or other communication medium may be used to provide communication between transceiver station(s) 12 and control station 14. In some implementations, the radar transmit and receive functionality may be separate. Thus, instead of individual transceiver station(s) 12, a number of separate transmitter stations and receiver stations may be provided, where the transmitter stations transmit the radar pulses and the receiver stations receive and process the corresponding return signals.

As illustrated. in FIG. 1, transceiver station 12 may include one or more antennas 22 to facilitate the transmission of RF pulses into a target space and/or the reception of return signals from the target space. Any type of antenna(s) may be used. In some embodiments, antennas having steerable beams may be used, while in other embodiments, antennas having stationary beams may be employed. In at least one embodiment, a phased array antenna having an electronically steerable beam is used (e.g., an active electronically steered array (AESA), etc.). As shown, antenna(s) 22 may transmit an RF pulse within a beam 26 toward a target 18. The pulse may be reflected 28 from target 18, with a portion of the reflected energy being directed back toward transceiver station 12 as a return signal. After reception, transceiver station 12 may process the return signal to determine information about target 18 such as, for example, the target range, the target Doppler frequency, the target range rate and/or velocity, the target radar cross section (RCS), and/or other information. This information may then be delivered to control station 14 via network 24. In some implementations, the raw return information may be uploaded to control station 14 for calculation of the target information at that location.

Because the number of targets/objects being tracked by a system such as surveillance space tracker radar system 10 can be large, the amount of radar resources that may be available for each individual target may be limited. For example, the amount of time that may be available to detect new targets may be small. In addition, the amount of processing resources that may be available for processing return signals from a target may be limited. As will be appreciated, techniques that are capable of reducing the amount of time and/or the amount of processing resources that are required to derive accurate information about targets may be highly desirable.

In various embodiments described herein, systems and techniques are provided that are capable of deriving accurate information about a target using only a single pulse of transmitted radio frequency (RF) energy. A bank of matched filters that are each tuned to a different Doppler frequency may be used to process target returns from the single transmitted pulse. Computationally efficient interpolation techniques may also be used to estimate an actual Doppler frequency based on output signals of the matched filters. As will be described in greater detail, in some implementations, the pulse that is used may include a linear frequency modulated pulse (e.g., a chirp signal). However, in other implementations, pulses may be used that utilize other types of modulation (with a simple accommodation for Doppler tolerance and range-Doppler coupling characteristics). The pulses that are used may have a low bandwidth. Although the techniques described herein are capable of deriving accurate information using a single transmitted pulse, it should be appreciated that they may also be used in systems that transmit more than one pulse to detect a target. It should also be appreciated that the techniques and systems described herein are not limited to use in surveillance space tracker systems, but may be used in any type of radar system that derives information about remote moving objects.

Using techniques described herein and variations thereof, it is possible to determine true target range, target velocity (i.e., range rate), and return signal amplitude/RCS using a single, low bandwidth, linear FM modulated pulse. In at least one implementation, these techniques may be used during a surveillance operation to search for targets in a particular region. Once targets have been identified and initial target information has been obtained, a radar system may be able to more easily transition to higher bandwidth precision track waveforms with minimal resources (e.g., fewer verify or track initiation waveforms with smaller receive windows and pulse widths matched to target RCS).

FIG. 2 is a block diagram illustrating a radar transceiver station 30 that may incorporate features described herein in accordance with an embodiment. As illustrated, transceiver station 30 may include, for example, an RF transceiver 32, a baseband processing unit 34, a memory 36, a user interface 38, and a network interface 40. One or more antennas 42 may be provided to facilitate the transmission and reception of RF signals. RF transceiver 32 may be operative for transmitting radar signals (e.g., radar chirp pulses and/or other types of pulses) during transmit operations and receiving return signals during receive operations, via antenna(s) 42. In at least one implementation, RF transceiver 32 may include a digital receiver/exciter (DREX), although other types of transceivers may alternatively be used. In some embodiments, an antenna steering unit 44 may be provided for use in steering an antenna beam of antenna 42. The antenna steering unit 44 may be controlled by, for example, baseband processing unit 34 or some other control unit.

During a receive operation, a receiver within RF transceiver 32 may amplify and filter a return signal and down convert the return signal to a baseband representation. Baseband processing unit 34 may then process the baseband representation to derive information from the return signal about one or more targets. During a transmit operation, baseband processing unit 34 may instruct RF transceiver 32 when to transmit a pulse. In some implementations, baseband processing unit 34 may also identify a type of pulse that RF transceiver 32 is to transmit (e.g., a linear chirp, a non-linear chirp, etc.). Memory 36 may be operative for storing digital data for transceiver station 30. Memory 36 may include any type of system, device, or component, or combination thereof, that is capable of storing digital information (e.g., user data, computer executable instructions and/or programs, FPGA configuration files, etc.) for access by a processing device or other component.

User interface 38 is an interface that may be used by a user or operator associated with transceiver station 30 to, for example, control operation of the station and/or monitor the target information generated by baseband processing unit 34. User interface 38 may include structures such as, for example, a keyboard, a liquid crystal display (LCD) or monitor, a speaker, a microphone, a mouse, a stylus, a graphical user interface (GUI), and/or any other form of device or structure that allows a user to input information and/or commands to a system or receive information and/or responses from a system. Network interface 40 is operative for providing an interface to one or more external networks for use in transmitting target information to a remote communication entity. For example, in at least one approach, network interface 40 may be used to upload information about targets to one or more external control stations. Network interface 40 may also be used to receive instructions or control information from one or more external control stations. Network interface 40 may support wired and/or wireless communication.

In some implementations, baseband processing unit 34 may include one or more digital processing devices to perform some or all of the baseband processing. The digital processing devices may include, for example, one or more of: a general purpose microprocessor, a digital signal processor (DSP), a controller, a microcontroller, a field programmable gate array (FPGA), a programmable logic array (PLAs), a programmable logic device (PLDs), a reduced instruction set computer (RISC), an application specific integrated circuit (ASIC), and/or others, including combinations of the above. In some implementations, at least some of RF transceiver 32 may also be implemented using digital processing devices. It should be appreciated that radar transceiver station 30 of FIG. 2 is an example of one type of transceiver arrangement that may be used in a radar system incorporating features described herein. Other transceiver architectures may alternatively be used, including arrangements where the transmit and receive functionality are separately located.

FIG. 3 is a block diagram illustrating an exemplary processing arrangement 50 for processing a return signal in a radar system in accordance with an embodiment. As will be described in greater detail, processing arrangement 50 is capable of deriving accurate information about a radar target from the return of a single transmitted pulse. For example, in at least one embodiment, processing arrangement 50 may process a pulse return signal ($X_{DREX}$) to estimate a range (r), a range rate ($\dot{r}$), and a direction (e.g., azimuth and elevation, u and v coordinates, etc.) of a corresponding target. Processing arrangement 50 may also be capable of determining a radar cross section of the target. In some implementations, the direction of the target may be determined based on the direction that an antenna beam is pointing when a return signal is received from the target. In one approach, processing arrangement 50 may be implemented as part of the baseband receive processing of a radar system (e.g., within baseband processing unit 34 of transceiver station 30 of FIG. 2, etc.).

As illustrated in FIG. 3, processing arrangement 50 may include: a fast Fourier transform (FFT) 52, a matched filter bank 54, an inverse fast Fourier transform 56, a detection processing unit 58, and a parameter estimation unit 60. During operation, FFT 52 may receive a baseband representation of a return pulse ($X_{DREX}$) that resulted from transmission of a single linear FM pulse (or other type of pulse) from a corresponding transmitter. FFT 52 converts the return pulse to a frequency domain representation which is delivered to the filters of matched filter bank 54. To reduce system cost, a single FFT may be used for all filters (although multiple FFTs may be used in some implementations). Matched filter bank 54 includes a plurality of matched filters 62, 64, 66, 68, 70 that are each tuned to a different Doppler frequency. The output signals of matched filter bank 54 are delivered to inverse fast Fourier transform 56, which converts the output signals to a time domain representation. In at least one embodiment, IFFT 56 includes a number of individual IFFTs, with one IFFT corresponding to each of the filters in matched filter bank 54. Although illustrated as using an FFT and an IFFT, it should be appreciated that other forms of discrete Fourier transform may be used in other embodiments.

Detection processing unit 58 is operative for detecting the presence of a target and for establishing range bins for the target by processing the time domain output signals of IFFT 56. Parameter estimation unit 60 may then analyze the output signals of detection processing unit 58 to estimate parameters associated with a detected target. In at least one embodiment, these parameters may include the true range of the target, the Doppler frequency of the target, and the range rate of the target. These parameters may also include, for example, the radar cross section of the target and the direction of the target (e.g., elevation and azimuth, etc.). The various components of processing arrangement 50 may be implemented using any combination of hardware, reconfigurable hardware, firmware, and/or software.

As described above, the matched filters 62, 64, 66, 68, 70 of matched filter bank 54 are each tuned to a different Doppler frequency. This may be achieved by shifting the frequency samples input to each matched filter by a specific amount with respect to a preceding matched filter. In at least one implementation, each filter in matched filter bank 54 will be shifted by a fixed delta frequency $\Delta f_d$ with respect to a previous filter in the bank (although non-uniform delta frequencies may be used in some implementations). The matched filters 62, 64, 66, 68, 70 of matched filter bank 54 have overlapping filter responses. In at least one embodiment, the fixed delta frequency between filters will be approximately 0.25 to 0.5 of the waveform bandwidth (when, for example, linear FM pulses are being used).

The overall frequency coverage of matched filter bank 54 may depend upon the maximum Doppler frequencies (or maximum velocities) expected for the targets being searched or tracked. For example, for a space surveillance radar monitoring objects in low Earth orbit (LEO), the highest expected velocities of tracked objects in LEO may be used to determine the frequency range to be covered by matched filter bank 54 (e.g., in one implementation, a range between −10 kilometers/second and +10 kilometers/second may be used for a LEO surveillance and tracking radar). The frequency range to be covered and the selected delta frequency between filters will typically dictate the number of filters to be used in matched filter bank 54. In some implementations, the center frequencies of the matched filters in matched filter bank 54 may be determined as follows:

$$F_c(n) = \begin{cases} -\dfrac{fd_{max}}{2} + q_c \Delta f & \text{if } n \leq \dfrac{N_f - 1}{2} \\ (n-k)\Delta f & \text{Otherwise} \end{cases}$$

where $F_c(n)$ are the center frequencies of the filters; n is the filter index; $fd_{max}$ is the maximum Doppler frequency to be covered; $N_f$ is the number of filters in the filter bank; $\Delta f$ is the filter spacing which is equal to $fd_{max}/(N_f-1)$; $q_n=N_f+1/2-n+1$; and $k=N_f+1/2$. The normalized filter center frequencies may be defined as:

$$f_c(n)=F_c(n)/F_{IQ}$$

where $F_{IQ}$ is the baseband sampling rate of the radar receiver (e.g., the sampling rate used during digital down conversion in the receiver). It should be appreciated that other schemes for arranging matched filters in a matched filter bank may be used in other implementations.

The matched filters in matched filter bank 54 may include any type of matched filter. As is well known, as matched filter is a filter that correlates an unknown signal (e.g., a received signal) with a known signal (e.g., a transmitted signal) to determine whether elements of the known signal occur within the unknown signal. In this manner, a matched filter is generally matched to the waveform that it is designed to operate with. A matched filter may be designed to result in a maximum, or near maximum, signal to noise ratio (SNR) in the filtered signal. In at least one embodiment, the matched filters within matched filter bank 54 may include pulse compression filters that work to compress linear FM pulses or similar modulated pulses.

Detection processing unit 58 may use any of a variety of different detection techniques to detect target returns, either adaptive or non-adaptive. In some implementations, the complex voltages output by the matched filters may be converted to magnitude, magnitude squared, or to magnitude representations to support the detection processing. In at least one embodiment, detection processing unit 58 may use constant false alarm rate (CFAR) processing to detect the presence of return pulses. As is well known, CFAR processing uses as detection threshold that adapts over time to maintain a relatively constant false alarm rate in a receiver. Alternative techniques may be used in other implementations.

Because of overlaps in the matched filter bands, a target will often be detected within the outputs of multiple matched filters simultaneously. In some implementations, detection processing unit 58 may separately analyze the output signals of each of the matched filters in matched filter bank 54 to detect pulses. In some implementations, detection processing unit 58 may also select one of the matched filters as the "detection" matched filter. This selection may be made based upon, for example, the magnitude of the detected signal (e.g., the matched filter having the highest peak output magnitude may be deemed the detection filter) or some other criterion. Subsequent processing of the filtered data may then center around the output of the detection filter.

FIGS. 10-14 are diagrams illustrating plots of the processed output signals of matched filters within a matched filter bank in various operational scenarios. As shown, each figure includes 15 plots representing the outputs of 15 matched filters of a matched filter bank. Each of the figures uses the same transmit waveform (i.e., pulsewidth=2.4 milliseconds (ms) and bandwidth=0.1 megaHertz (MHz)) and the same baseband sampling rate (0.5 MHz). However, each figure corresponds to a target having a different range rate and Doppler frequency. As shown, in each case, one of the matched filters is selected as the detection matched filter (indicated as $F_{DET}$ on the corresponding output plots). As will be described in greater detail, this information may be used in subsequent processing to determine estimates of various target parameters.

Returning to FIG. 3, parameter estimation unit 60 estimates parameters associated with a target using the return information output by the detection processing unit 58. As will be described in greater detail, even when only a single pulse is transmitted, parameter estimation unit 60 can make a relatively accurate estimate of both the range and the range rate of the target. Parameter estimation unit 60 may also determine a true amplitude of a return signal (which is related to, for example, target radar cross section (RCS)). In some implementations, computationally efficient sample interpolation may be employed to determine a true Doppler frequency of a target that occurs somewhere between the Doppler frequencies associated with two adjacent matched filters. The true Doppler frequency may then allow range rate to be accurately estimated. The true amplitude of the return signal may also be computed based on an amplitude mismatch power loss relationship associated with the waveform. True range may also be estimated based upon the range-Doppler coupling characteristics of the pulse waveform.

In at least one embodiment, a calibration procedure may be undertaken within a radar receiver to support single pulse operation. In one approach, the calibration procedure may be performed once and the corresponding calibration data may be stored within the radar receiver for subsequent use during target search, detection, and/or tracking operations. The calibration data may be used to, for example, perform interpolation during radar operations.

Figure 4:
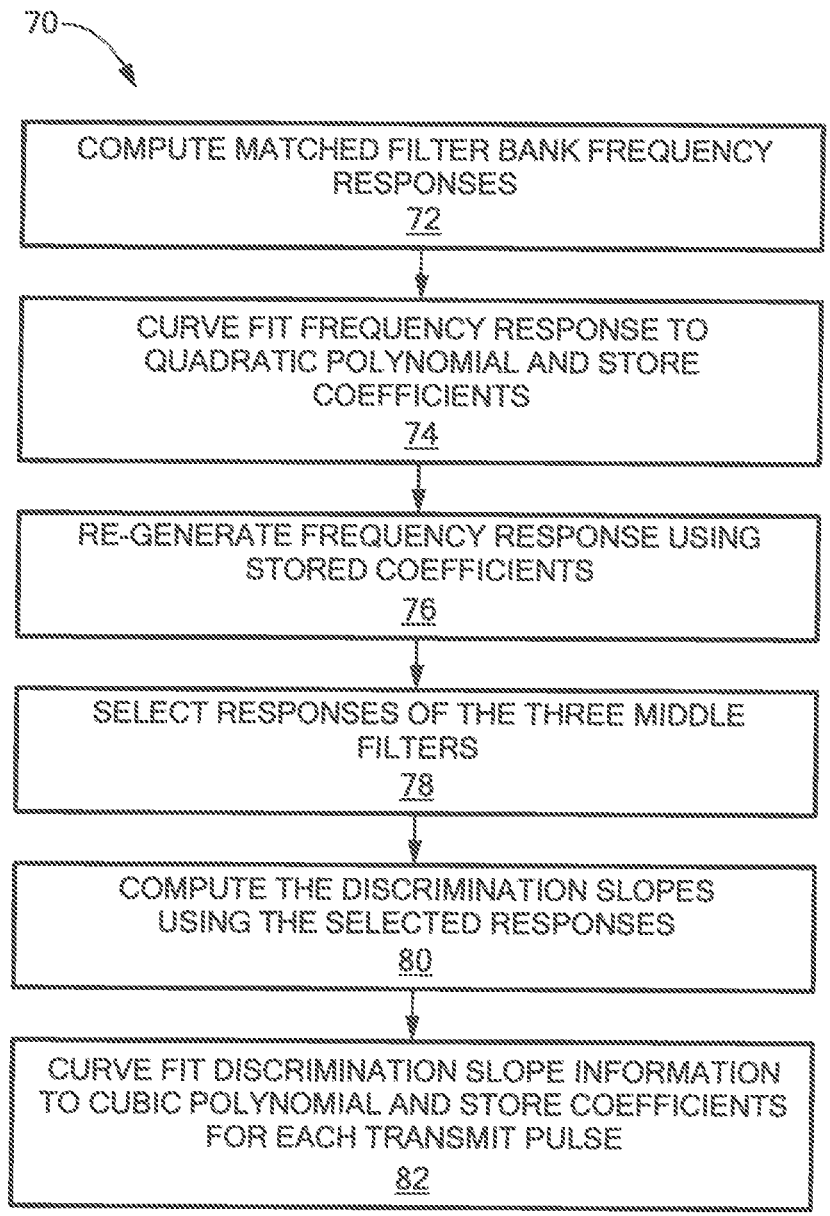
FIG. 4 is a block diagram illustrating an exemplary calibration method that may be used to calibrate a radar system in accordance with an embodiment.
Figure 5:
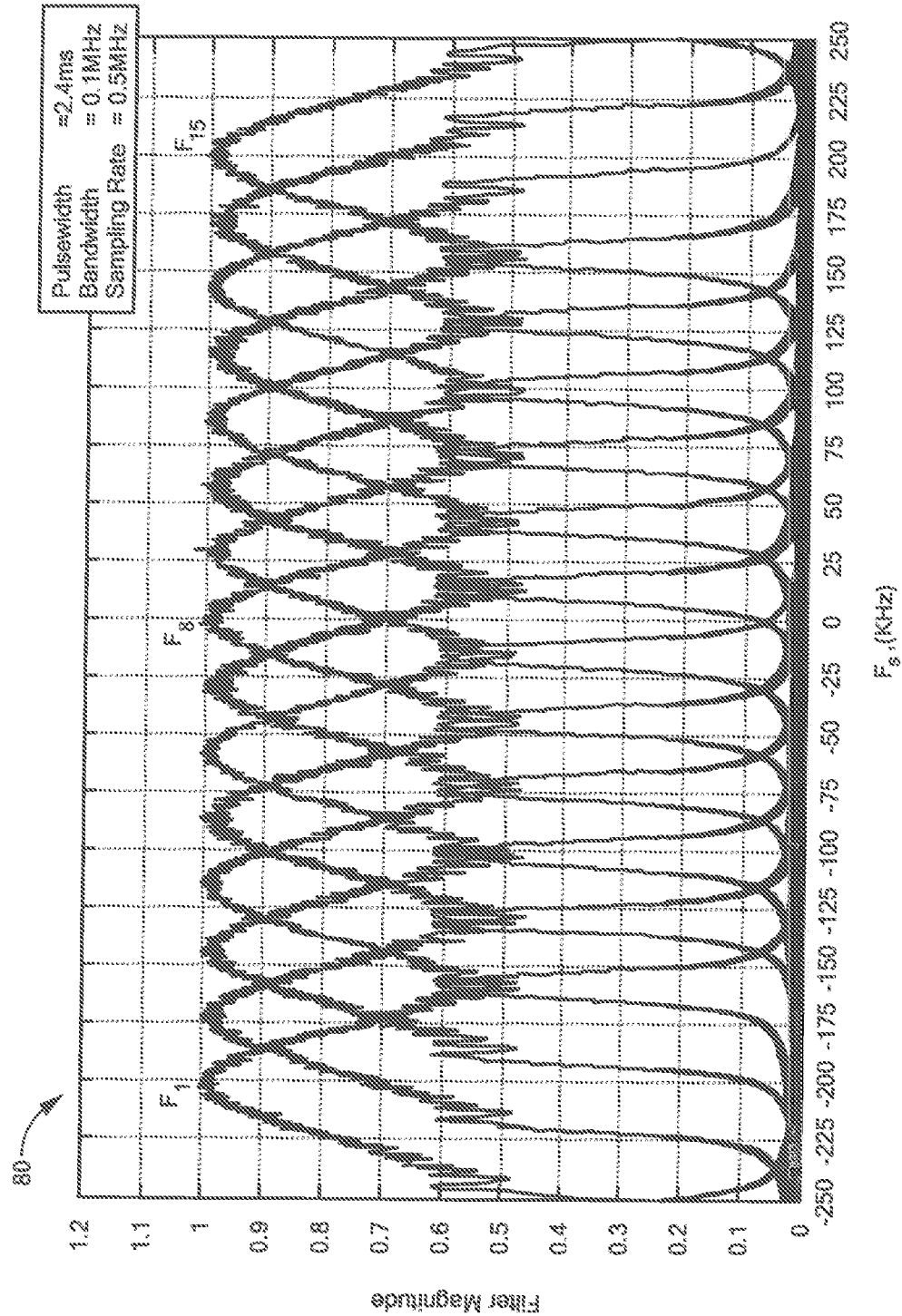
FIG. 5 is a filter magnitude versus frequency plot illustrating exemplary matched filter frequency responses that may be used in an embodiment.

FIG. 4 is a block diagram illustrating an exemplary calibration method 70 that may be used to calibrate a radar system to perform interpolations in accordance with an embodiment. As shown in FIG. 4, the frequency responses of the matched filters within a matched filter bank of a radar system may first be determined (block 72). As described previously, the frequency responses of the matched filters will typically be dictated by the type of waveform that will be used within a transmit pulse during radar operation. FIG. 5 is a filter magnitude versus frequency plot 80 illustrating exemplary matched filter frequency responses in accordance with an implementation. As shown, the plot 80 may include a separate frequency response curve for each of the matched filters within the matched filter bank. It should be noted that the bandwidths of the various frequency responses are relatively narrow and, correspondingly, the filter curves include significant ringing.

Figure 6:
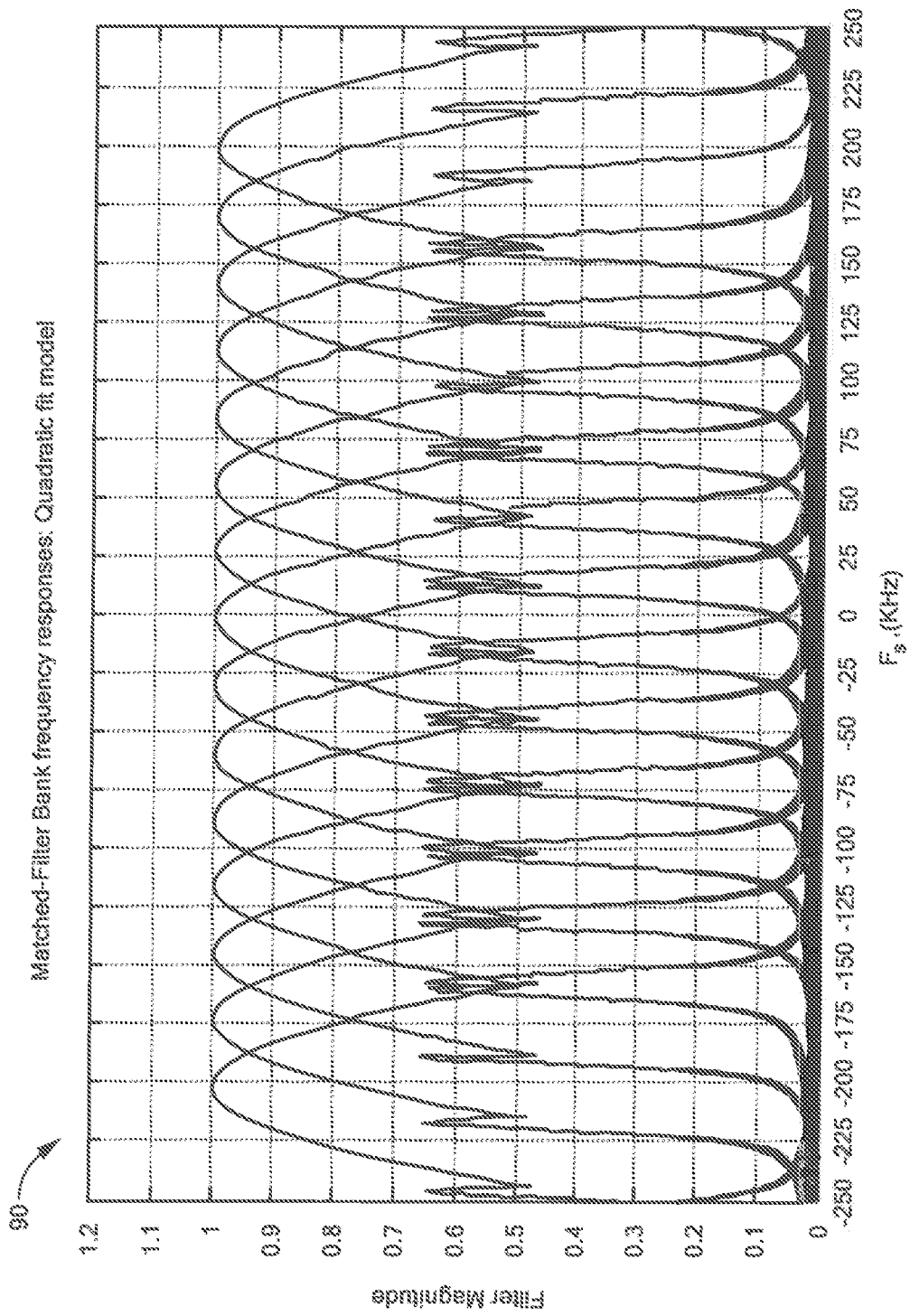
FIG. 6 is a filter magnitude versus frequency plot illustrating re-generated filter frequency response curves in accordance with an embodiment.

Returning now to FIG. 4, curve fitting techniques may next be used to fit the frequency response curve information to a first polynomial (block 74). In at least one implementation, a quadratic polynomial is used, although other polynomial types may be used in other embodiments. The coefficients of the first polynomial may be stored in a memory of the corresponding radar system (e.g., memory 36 of FIG. 2). The coefficients may subsequently be used to re-generate the frequency response curves (block 76). FIG. 6 is a filter magnitude versus frequency plot 90 illustrating re-generated filter frequency response curves in accordance with an implementation. As shown, the re-generated curves are much cleaner than the original frequency response information and much better suited for use in future interpolation operations.

As shown in FIGS. 5 and 6, in some implementations, the frequency response curves of the matched filters will all be substantially the same, shifted in frequency from one another. For this reason, interpolation values developed for any subset of the curves may be used in some embodiments to characterize the curves for all of the filters in the matched filter bank. Frequency responses may next be selected for two or three (or more) adjacent matched filters for use in developing interpolation information (block 78). In the illustrated embodiment, responses for the three middle filters are used, but any two or three adjacent filters can be used in other implementations. Discrimination slope information may next be computed using the selected frequency responses (block 80). After the discrimination slope data has been collected, curve fitting may be used to fit the discrimination slope data to a second polynomial (block 82). In at least one implementation, the second polynomial may be a cubic polynomial, although other polynomial types may be used in other implementations. The coefficients of the cubic polynomial may then be stored in memory (e.g., memory 36 of FIG. 2) for later use in performing interpolation operations.

In at least one embodiment of the invention, the frequency responses of the matched filters in the matched filter bank may be determined as follows. First, Doppler frequency limits may be selected based on the target range rate requirements for the system of interest. A frequency grid may next be generated based on these limits. The frequency grid may cover both negative and positive frequencies. A frequency response of filter zero (i.e., zero range rate filter) may next be computed. This frequency response may then be used to add filters to the frequency grid by applying frequency shifts. The frequency shifts are related to the filter spacing and the spacing is related to the number of filters. The resulting response may then be plotted based on the frequency grid generated above.

Figure 7:
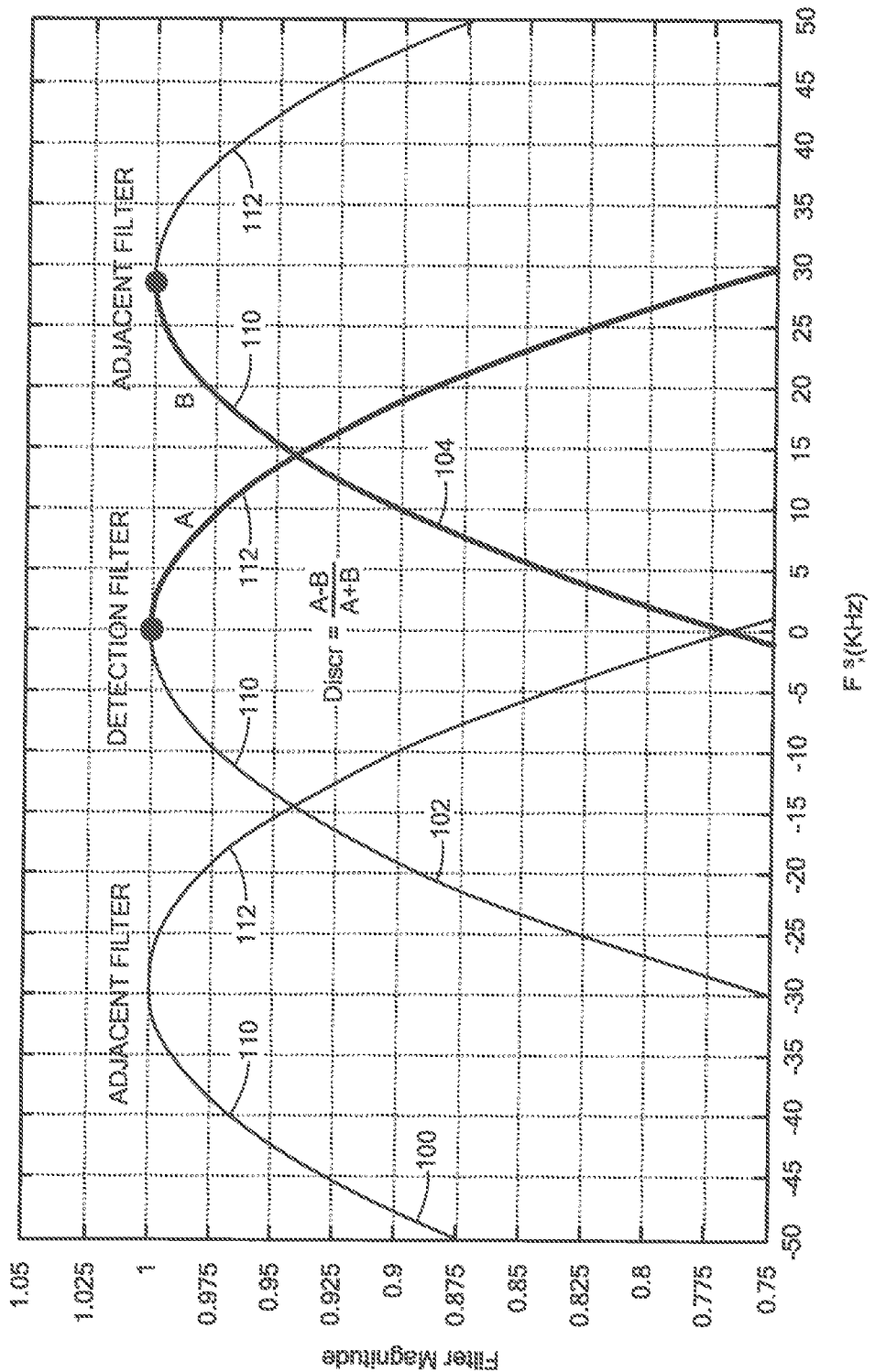
FIG. 7 is a diagram showing an exemplary technique for computing discrimination slope information in accordance with an embodiment.

FIG. 7 is a diagram showing an exemplary technique for computing the discrimination slope information in accordance with an implementation. As shown, the three middle frequency responses 100, 102, 104 of the matched filters have been selected. The frequency response 102 in the center is considered the detection filter (i.e., the filter that includes the detected pulse) and the other responses 100, 104 are considered adjacent filters for purposes of calculating the discrimination slopes. Each frequency response 100, 102, 104 has a positive slope portion 110 and a negative slope portion 112. The discrimination slope vector may be calculated as follows:

discrimination slope=$A-B/A+B$ where A represents a portion of the frequency response curve of the detection filter and B represents a portion of the frequency response curve of an adjacent filter. The discrimination slope may be separately calculated for both the higher adjacent filter 104 and the lower adjacent filter 100. For the higher adjacent filter, curve A may be taken from the negative slope portion 112 of center response 102 and curve B may be taken from the positive slope portion 110 of the response 104. For the lower adjacent filter, curve A may be taken from the positive slope portion 110 of center response 102 and curve B may be taken from the negative slope portion 112 of response 100. In either case, the discrimination slope vector may take into consideration a large number of points on curves A and B. In some implementations, coefficients may only need to be generated for one side of the center response 102. That is, the other side will simply be the negative of the first side (assuming response symmetry). Coefficients may be developed in this manner (and stored) for each different wave form that may be used in the corresponding radar system.

Figure 8:
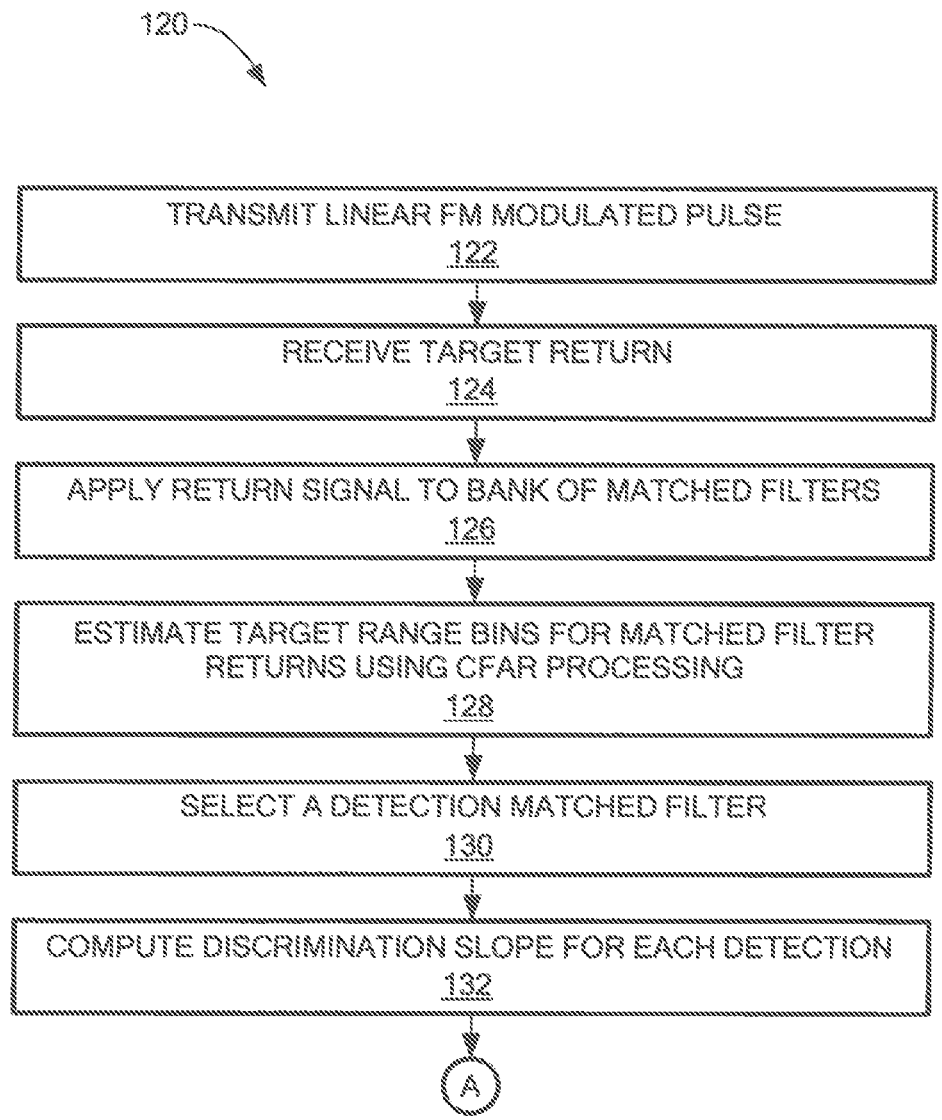
FIGS. 8 and 9 are portions of a flowchart illustrating an exemplary method for estimating information about a remote target using a single transmitted pulse and a bank of matched filters in accordance with an embodiment.
Figure 9:
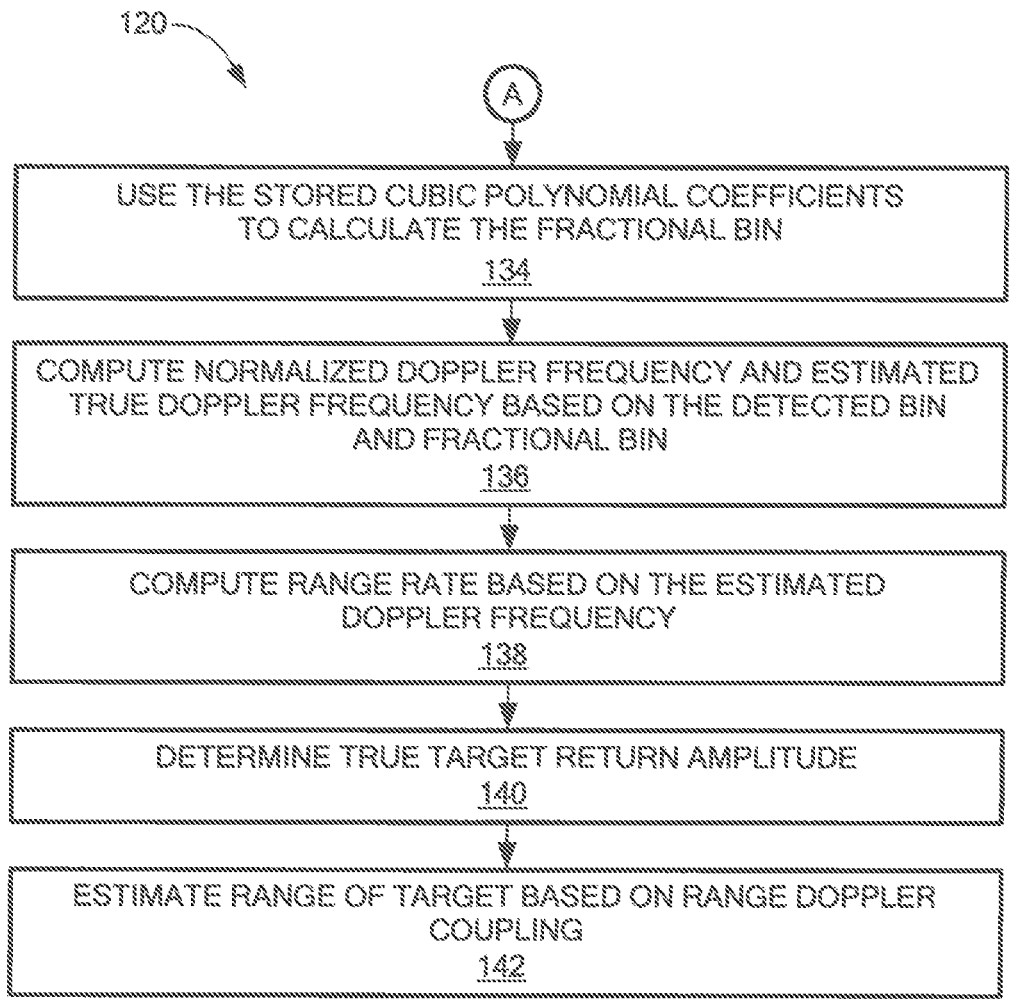
Figure 10:
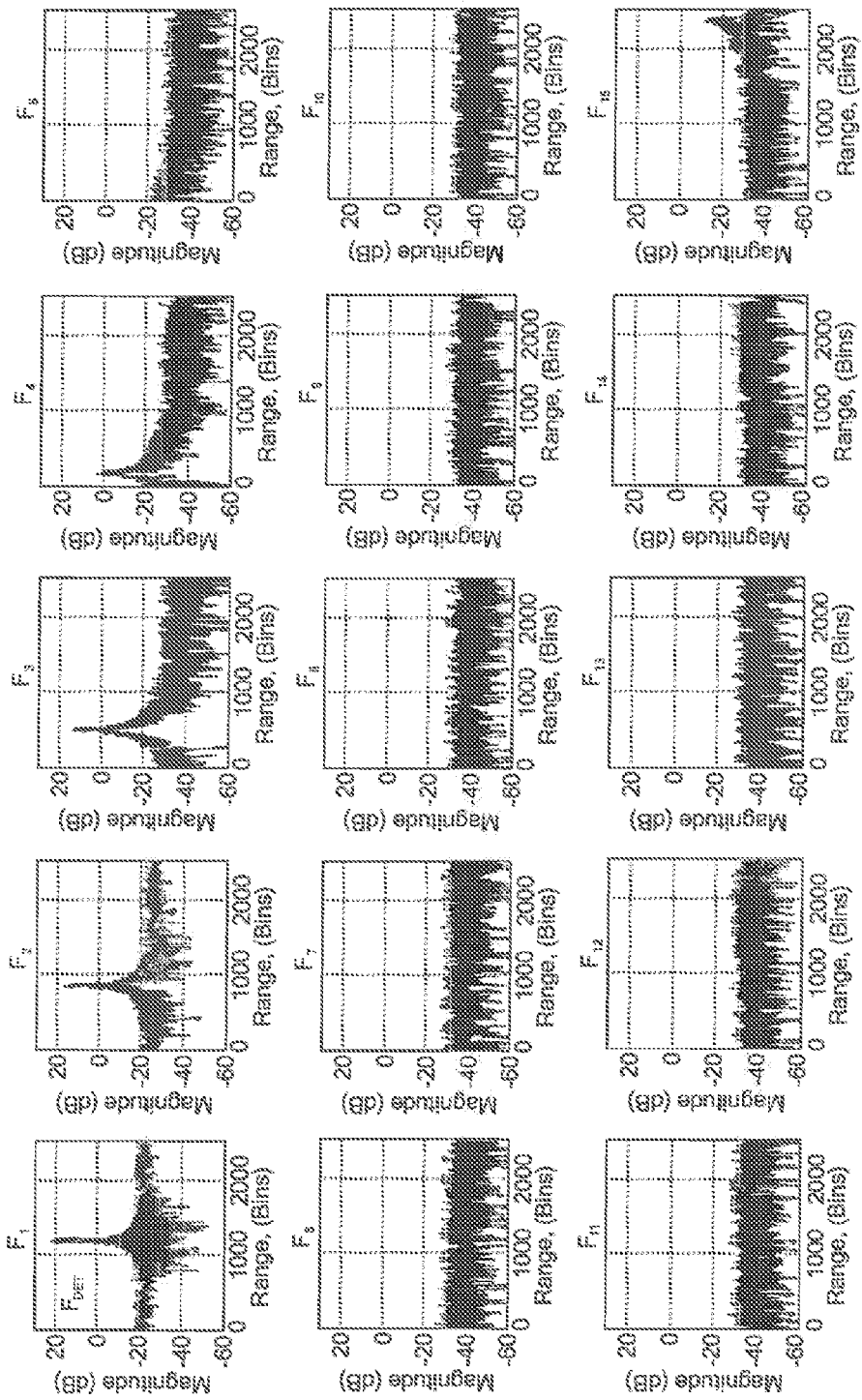
FIGS. 10-14 are plots illustrating exemplary output signals of matched filters in a matched filter bank in various operational scenarios in accordance with an embodiment.
Figure 11:
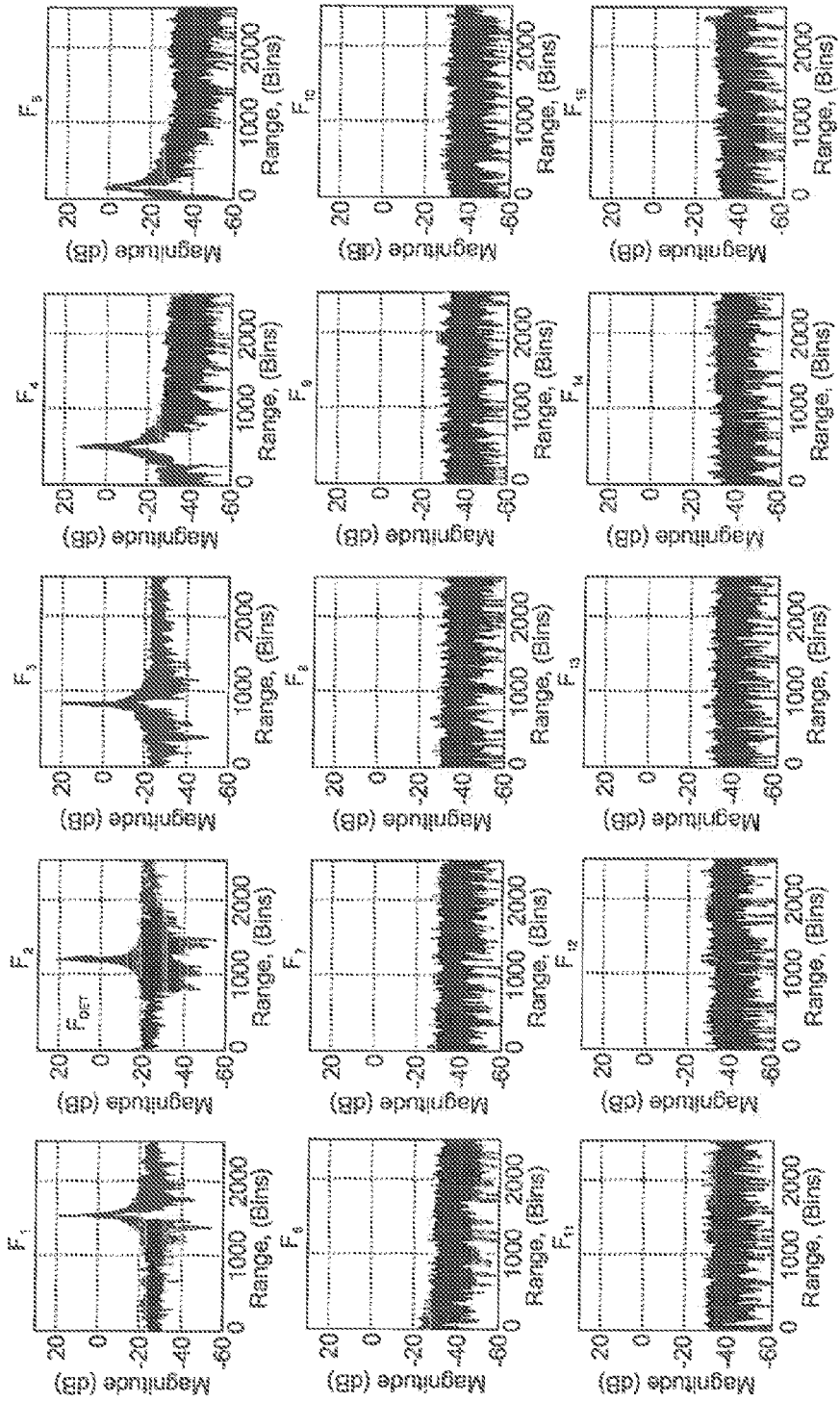
Figure 12:
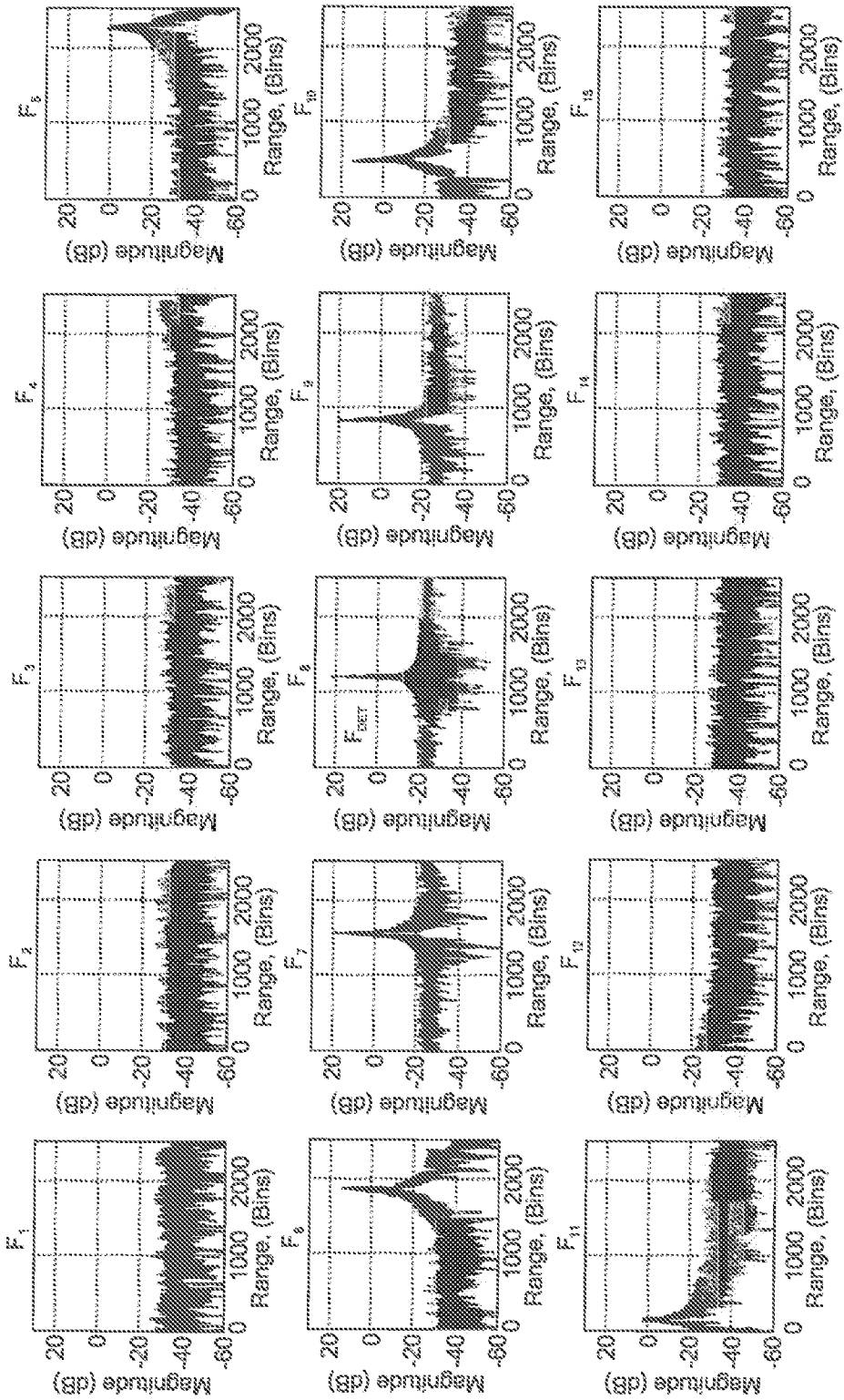
Figure 13:
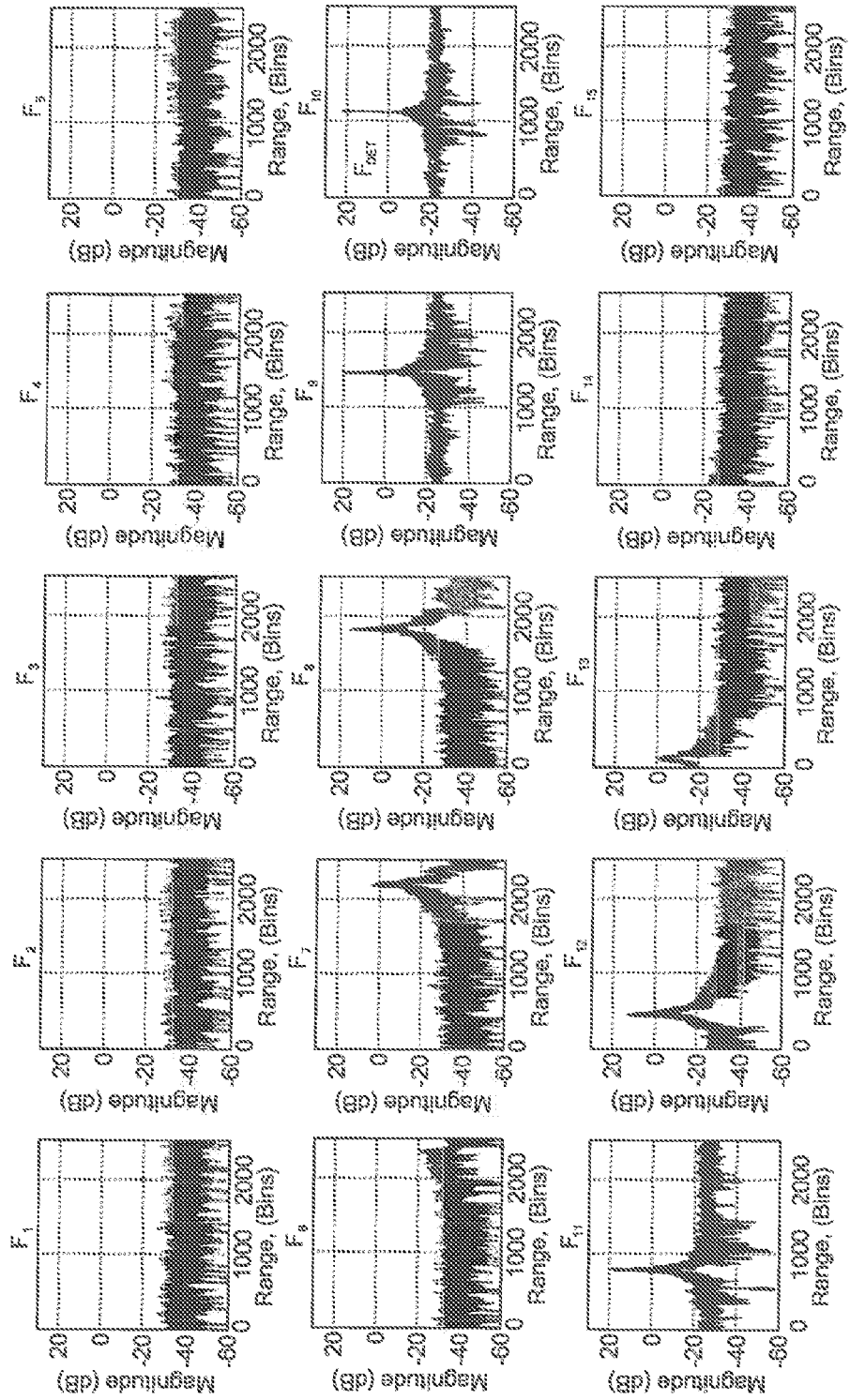
Figure 14:
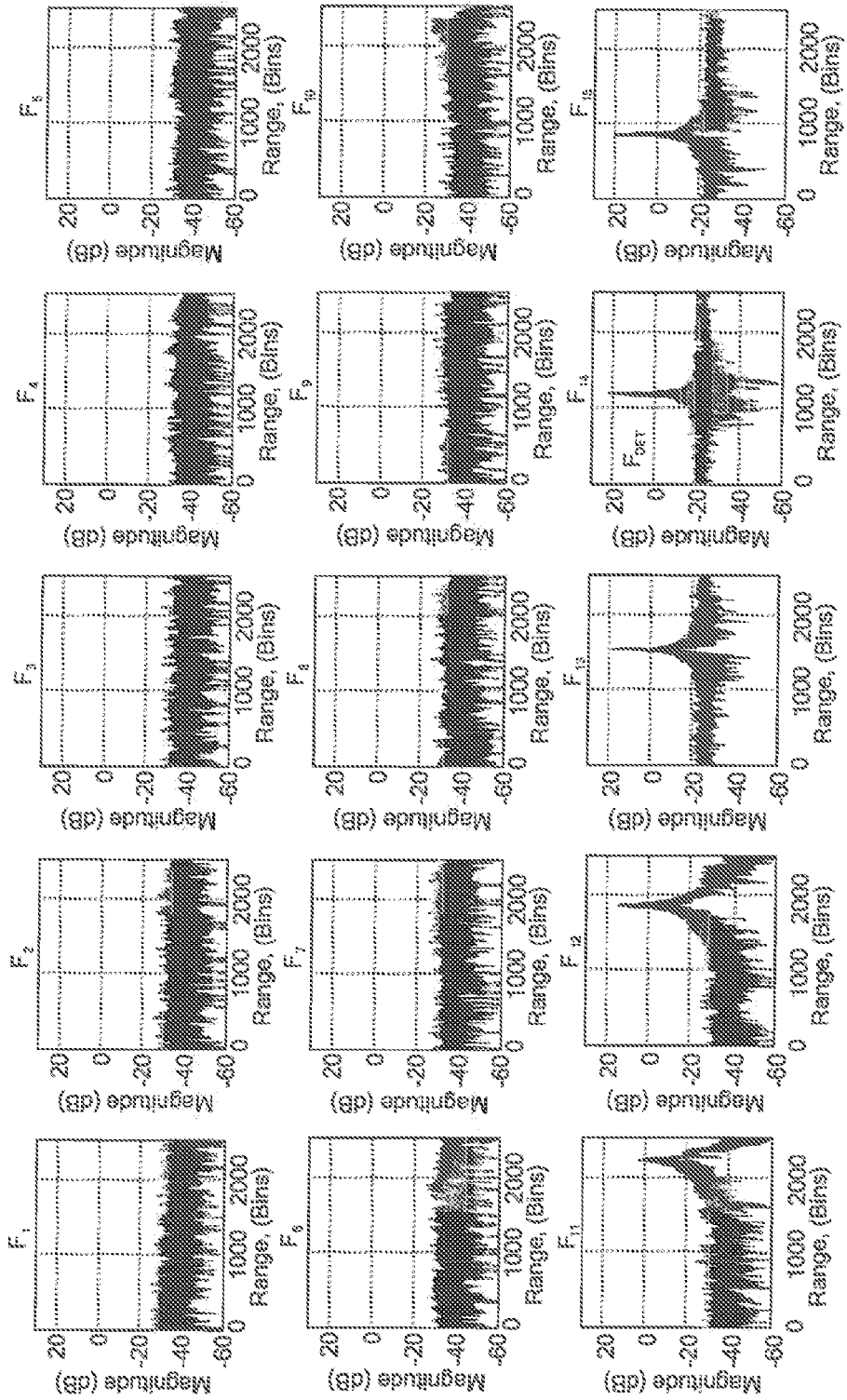

FIGS. 8 and 9 are portions of a flowchart illustrating an exemplary method 120 for estimating information about a remote target using a single transmitted pulse and a bank of matched filters in accordance with an embodiment. The method 120 may be used in connection with, for example, processing arrangement 50 of FIG. 3 and similar radar processing arrangements. A linear FM modulated pulse is first transmitted from an RF transmitter into a target space (block 122). A return signal may then be received at an RF receiver (block 124). In some implementations, the RF transmitter and the RF receiver may be co-located. In other implementations, the RF receiver may be geographically separate from the transmitter. The return signal may then be converted to a frequency domain representation (using, for example, a discrete Fourier transform) and distributed to a bank of matched filters (block 126). As described previously, the matched filters may each be tuned to a different Doppler frequency. Target range bins may then be estimated for each matched filter output using, for example, CFAR processing or another detection technique (block 128). One of the matched filters in the filter bank may next be selected as a "detection" matched filter (block 130). As described previously, in one approach, the matched filter having the highest output peak may be selected as the detection filter. For example, with reference to FIG. 12, the matched filter tuned at Doppler frequency $F_8$ may be selected as the detection filter as it has a higher peak magnitude than any of the other filters in the bank.

Typically, the true Doppler frequency of the target will be different from the Doppler frequency associated with the detection filter. That is, the true Doppler frequency will be somewhere between the Doppler frequency associated with the detection filter and the Doppler frequency associated with an adjacent filter. In at least one embodiment, interpolation may be used to estimate the true Doppler frequency based on the Doppler frequency of the detection filter. To perform the interpolation, a discrimination slope may be calculated for the detection (block 132). To determine the discrimination slope, it must first be determined whether the true Doppler frequency is higher or lower than the frequency of the detection filter. This may be achieved by comparing the peak magnitudes of the two adjacent filters of the detection filter. That is, the true Doppler frequency may be assumed to be in the direction of the adjacent filter having the higher peak magnitude. The discrimination slope value may then be computed as follows:

$$\Delta_{discrim} = \frac{Det_a - Det_b}{Det_a + Det_b}$$

where $Det_a$ is the peak magnitude of the detection filter and $Det_b$ is the peak magnitude of the relevant adjacent filter. The computed discrimination slope is a scalar value.

After the discrimination slope value has been computed, the slope value and the previously stored cubic polynomial coefficients may be used to calculate a "fractional bin" that will allow the true Doppler frequency of the target to be computed (block 134). As described previously, the stored cubic polynomial coefficients represent a polynomial equation having a single variable. The discrimination slope value computed above in block 132 may be used as the variable in the polynomial equation to determine a ratio that is representative of the fractional bin. This may be represented as follows:

$$frac_{bin} = \sum_{n=1}^{N} p_n \Delta_{discrim}^{N-n}$$

where $p_n$ are the stored coefficients. After the fractional bin has been calculated, the detected bin and the fractional bin may be used to compute the normalized Doppler frequency (block 136). In one approach, the normalized Doppler frequency may be calculated as follows:

$f_{norm} = f_c(\text{detection}) \pm \Delta f_d \times frac_{bin}$ where $f_c(\text{detection})$ is the center frequency of the detection matched filter and $\Delta f_d$ is the filter spacing. The above equation will use addition if the true Doppler frequency is above the frequency of the detection filter and subtraction if the true Doppler frequency is below the frequency of the detection filter. The true Doppler frequency may then be estimated as follows:

$$f_{Doppler} = f_{norm} \times F_{IQ}$$

where $F_{IQ}$ is the baseband sampling rate of the radar receiver.

The range rate of the target may next be estimated based on the estimated true Doppler frequency (block 138). That range rate estimate may be computed as follows:

$$\dot{r} = -f_{Doppler} \times \frac{\lambda}{2}$$

where $\lambda$ is the wavelength at the center frequency of the transmitted RF pulse. The true amplitude of the return signal may next be estimated based on the amplitude of the output signal of the detection filter (block 140). In one approach, this may be achieved using an amplitude mismatch power loss relationship. Due to the time and frequency ambiguity property of a single pulse linear FM waveform, an amplitude mismatch loss will occur within returns from a moving target that have Doppler shifts that are a significant proportion of the linear FM swept bandwidth. This amplitude mismatch may be expressed as follows:

$$L_{dB} = 20 \times \log_{10}\left(1 - \frac{|f_D|}{B}\right)$$

where $f_D$ is the Doppler frequency shift and B is the linear FM bandwidth. Knowing the peak amplitude of the output signal of the detection matched filter and the waveform characteristics, this equation may be used to determine the true amplitude of the return signal. This true amplitude may be used as an indication of the radar cross section of the target of interest.

The true range of the target may next be estimated (block 138). In at least one implementation, the true range may be estimated based on the range-Doppler coupling characteristics of the corresponding pulse waveform. The range-Doppler coupling may be computed as follows:

$$r_{coupling} = F_c \times PW/BW \times \dot{r}_{error}$$

where $F_c$ is the commanded RF center frequency of the waveform in Hertz, PW is the waveform pulse width in seconds, BW is the chirp bandwidth in Hertz, and $\dot{\gamma}_{error}$ is the residual range rate error in meters per second. The range rate error may be defined as the difference between the estimated range rate (i.e., the range rate estimated using the matched filter bank) and the predicted range rate. The true range estimate may then be computed as follows:

$$r_{detected} = r_{measured} - r_{coupling}$$

where $r_{detected}$ is the estimated true range and $r_{measured}$ is the signal processing range estimation determined without Doppler information.

In the description above, various embodiments have been described that utilize linear FM modulated pulses. It should be appreciated that other types of pulses and pulse modulation schemes may be used in other implementations. In addition, the various described embodiments typically refer to the use of a single pulse to detect and derive information related to a target. While the described techniques make it possible to derive accurate target information using a single transmitted pulse, it should be appreciated that many of the described features and techniques may also be implemented within radar systems that use multiple pulses per target. That is, the various techniques and features described herein are not limited to use within systems that practice single pulse target detection.

Various flow diagrams have been presented herein (e.g., FIGS. 4 and 8) describing novel processes in accordance with different embodiments. The rectangular elements in these flow diagrams (typified by element 72 in FIG. 4) are herein denoted "processing blocks" and may represent computer software instructions or groups of instructions. It should be noted that these flow diagrams typically represent one exemplary embodiment of a design described herein and variations in such a diagram, which generally follow the process outlined, are considered to be within the scope of the concepts, systems, and techniques described and claimed herein.

Alternatively, the processing blocks may represent operations performed by functionally equivalent circuits such as a digital signal processor (DSP) circuit, an application specific integrated circuit (ASIC), a field programmable gate array (FPGA), and/or other types of circuits. Some processing blocks may be manually performed while other processing blocks may be machine performed, such as by a processor or circuit. The flow diagram does not depict the syntax of any particular programming language. Rather, the flow diagram illustrates the functional information one of ordinary skill in the art requires to fabricate circuits and/or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes represented by the flow diagrams are unordered meaning that, when possible, the sequences shown in the diagrams can be performed in any convenient or desirable order.

Having described exemplary embodiments, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method for estimating information about a remote target using reflected energy in a radar system, the method comprising:

receiving a return signal at a receiver of the radar system, the return signal resulting from a single transmitted pulse reflecting off the remote target;

applying the return signal to a bank of matched filters of the radar system, wherein different matched filters in the bank of matched filters are tuned to different Doppler frequencies;

selecting, by a signal processor of the radar system, a matched filter having a highest output signal magnitude from the bank of matched filters, the selected matched filter being tuned at a first Doppler frequency;

interpolating, by the signal processor, an estimate of an actual Doppler frequency of the remote target based, at least in part, on the first Doppler frequency associated with the selected matched filter;

determining an estimated range rate of the target based, at least in part, on the estimate of the actual Doppler frequency of the target; and providing the estimated range rate of the target to at least one of a user interface and a network interface of the radar system.

2. The method of claim 1, further comprising:
determining an actual amplitude of the return signal based, at least in part, on an amplitude of the output signal of the selected matched filter and an amplitude mismatch power loss.

3. The method of claim 1, further comprising:
determining an actual range of the target based, at least in part, on a range-Doppler coupling characteristic associated with a waveform of the single transmitted pulse.

4. The method of claim 1, further comprising:
transmitting the single transmitted pulse before receiving.

5. The method of claim 1, wherein:
the single transmitted pulse includes a linear frequency modulated radio frequency (RF) pulse.

6. The method of claim 1, comprising:
tuning the filters in the bank of matched filters to Doppler frequencies having a fixed frequency spacing between successive filters.

7. The method of claim 6, wherein:
the fixed frequency spacing between successive filters is within a range from approximately 0.25 of the bandwidth of the transmitted pulse to approximately 0.50 of the bandwidth of the transmitted pulse.

8. The method of claim 1, wherein:
interpolating, by the signal processor, an estimate of an actual Doppler frequency of the target comprises determining whether the actual Doppler frequency is higher or lower than the first Doppler frequency based, at least in part, on peak magnitudes of output signals associated with two adjacent filters to the selected matched filter.

9. The method of claim 1, wherein:
interpolating, by the signal processor, an actual Doppler frequency of the target comprises computing a discrimination slope using a magnitude of an output signal of the selected matched filter and a magnitude of an output signal of an adjacent matched filter.

10. The method of claim 9, wherein:
interpolating, by the signal processor, an actual Doppler frequency of the target comprises determining, based on stored coefficients and the discrimination slop, a fractional bin representative of an offset between the actual Doppler frequency and the first Doppler frequency.

11. The method of claim 10, wherein:
determining, based on stored coefficients and the discrimination slope, a fractional bin representative of an offset between the actual Doppler frequency and the first Doppler frequency comprises evaluating a polynomial having the stored coefficients using the discrimination slope as a variable in the polynomial.

12. The method of claim 10, wherein:
interpolating, by the signal processor, an estimate of an actual Doppler frequency of the target comprises computing the actual Doppler frequency estimate using the fractional bin and a frequency spacing between matched filters in the bank of matched filters.

13. The method of claim 1, wherein:
applying the return signal to a bank of matched filters includes converting the return signal to a baseband representation, converting the baseband representation to a frequency domain representation, and applying the frequency domain representation to the bank of matched filters.

14. The method of claim 1, further comprising:
applying constant false alarm rate (CFAR) processing to the output signals of the bank of matched filters before selecting a matched filter having a highest output signal magnitude from the bank of matched filters.

15. A receiver of a radar system, the receiver comprising:
a bank of matched filters configured to process a radar return signal associated with a remote moving target, wherein each matched filter in the bank of matched filters is tuned to a different Doppler frequency; and one or more digital processors configured to:
detect pulses in output signals of the bank of matched filters; and
generate estimated parameters of the remote moving target based on output signals of the bank of matched filters resulting from transmission of a single radar pulse, the one or more digital processors configured to determine at least an actual range rate of the remote moving target and an actual amplitude of the received radar return signal.

16. The receiver system of claim 15, wherein:
the one or more digital processors are configured to determine at least an actual range rate of the remote moving target, an actual amplitude of the received radar return signal, and an actual range of the remote moving target.

17. The receiver system of claim 15, wherein:
the one or more digital processors are configured to determine an actual Doppler frequency of the remote moving target by interpolating between adjacent filters in the bank of matched filters.

18. The receiver system of claim 15, wherein the one or more digital processors are configured to:
select one of the matched filters in the bank of matched filters as a detection matched filter;
calculate a discrimination slope value based on peak amplitude levels of the output signals of the detection matched filter and an adjacent matched filter;
calculate a fractional bin ratio using the discrimination slope value and stored polynomial coefficient values; and
use the fractional bin ratio and the center frequency of the detection matched filter to determine an actual Doppler frequency of the remote moving target.

19. The receiver system of claim 18, wherein:
the one or more digital processors are configured to determine the actual amplitude of the received radar return signal based, at least in part, on an amplitude of the output signal of the selected matched filter and an amplitude mismatch power loss.

20. The receiver system of claim 15, wherein:
the one or more digital processors are configured to determine the actual range of the target based, at least in part, on a range-Doppler coupling characteristic of a transmitted pulse waveform.

21. The receiver system of claim 15, wherein:
the single radar pulse includes a linear frequency modulated (FM) radio frequency (RF) pulse.

22. The receiver system of claim 15, wherein:
the filters in the bank of matched filters are tuned to Doppler frequencies having a fixed frequency spacing between successive filters.

23. The receiver system of claim 22, wherein:
the fixed frequency spacing between successive filters is within a range from approximately 0.25 of the bandwidth of the transmitted pulse to approximately 0.50 of the bandwidth of the transmitted pulse.

24. The receiver system of claim 15, further comprising:
a discrete frequency transform (DFT) unit configured to convert the radar return signal from a time domain representation to a frequency domain representation before it is applied to the bank of matched filters; and
an inverse DFT unit configured to process the output signals of the bank of matched filters to convert the output signals from a frequency domain representation to a time domain representation before the one or more digital processors detect pulses in the output signals.

25. The receiver system of claim 15, wherein:
the one or more digital processors are configured to detect pulses in the output signals of the bank of matched filters using constant false alarm rate (CFAR) processing techniques.

26. A method for calibrating a radar receiver having a bank of matched filters that are each tuned at a different Doppler frequency, the method comprising:
by a processor of the radar receiver:
determining frequency responses of matched filters in the bank of matched filters;
curve fitting the frequency responses to a first polynomial having first coefficients;
re-generating the frequency responses using the first coefficients;
selecting at least two frequency response curves from the re-generated frequency responses;
calculating discrimination slope data using portions of the at least two selected frequency response curves;
curve fitting the discrimination slope data to a second polynomial having second coefficients;
storing the second coefficients in a memory for later use in interpolation operations;
employing the second coefficients to interpolate an estimate of an actual Doppler frequency of the remote target based, at least in part, on the first Doppler frequency associated with the selected matched filter;
determining an estimated range rate of the target based, at least in part, on the estimate of the actual Doppler frequency of the target; and
providing the estimated range rate of the target to at least one of a user interface and a network interface of the radar receiver.

27. The method of claim 26, wherein:
the first polynomial is a quadratic polynomial and the second polynomial is a cubic polynomial.

28. The method of claim 26, wherein:
calculating discrimination slope data using portions of the at least two selected frequency response curves includes evaluating the following vector:

$$\text{discrimination slope} = A - B/A + B$$

where A is a portion of a first of the at least two selected frequency response curves and B is a portion of a second of the at least two selected frequency response curves.

* * * * *